United States Patent
Cresswell et al.

(10) Patent No.: US 12,450,388 B2
(45) Date of Patent: Oct. 21, 2025

(54) IDENTIFYING AND MITIGATING DISPARATE GROUP IMPACT IN DIFFERENTIAL-PRIVACY MACHINE-LEARNED MODELS

(71) Applicant: THE TORONTO-DOMINION BANK, Toronto (CA)

(72) Inventors: Jesse Cole Cresswell, Toronto (CA); Atiyeh Ashari Ghomi, Toronto (CA); Yaqiao Luo, Toronto (CA); Maria Esipova, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 194 days.

(21) Appl. No.: 18/202,440

(22) Filed: May 26, 2023

(65) Prior Publication Data

US 2023/0385444 A1    Nov. 30, 2023

Related U.S. Application Data

(60) Provisional application No. 63/350,333, filed on Jun. 8, 2022, provisional application No. 63/346,812, filed on May 27, 2022.

(51) Int. Cl.
*G06F 21/62*    (2013.01)

(52) U.S. Cl.
CPC ................ *G06F 21/6245* (2013.01)

(58) Field of Classification Search
CPC ...... G06F 21/60; G06F 21/62; G06F 21/6245; G06N 20/00; G06N 3/08
See application file for complete search history.

(56) References Cited

U.S. PATENT DOCUMENTS

| | | | |
|---|---|---|---|
| 10,402,469 B2* | 9/2019 | McMahan | G06F 17/17 |
| 10,489,605 B2* | 11/2019 | Nerurkar | G06F 17/16 |
| 11,120,102 B2* | 9/2021 | McMahan | G06F 17/17 |

(Continued)

OTHER PUBLICATIONS

Hu, et al., "Adaptive clipping bound of deep learning with differential privacy," 2021 IEEE 20th International Conference on Trust, Security and Privacy in Computing and Communications (TrustCom), Mar. 9, 2022, 8 pages; https://ieeexplore.ieee.org/abstract/document/9724324.

(Continued)

*Primary Examiner* — Hosuk Song
(74) *Attorney, Agent, or Firm* — Patent Capital Group

(57) ABSTRACT

A model evaluation system evaluates the extent to which privacy-aware training processes affect the direction of training gradients for groups. A modified differential-privacy ("DP") training process provides per-sample gradient adjustments with parameters that may be adaptively modified for different data batches. Per-sample gradients are modified with respect to a reference bound and a clipping bound. A scaling factor may be determined for each per-sample gradient based on the higher of the reference bound or a magnitude of the per-sample gradient. Per-sample gradients may then be adjusted based on a ratio of the clipping bound to the scaling factor. A relative privacy cost between groups may be determined as excess training risk based on a difference in group gradient direction relative to an unadjusted batch gradient and the adjusted batch gradient according to the privacy-aware training.

18 Claims, 7 Drawing Sheets

(56) References Cited

U.S. PATENT DOCUMENTS

| | | | |
|---|---|---|---|
| 11,893,133 B2* | 2/2024 | Hockenbrocht | .... G06F 21/6245 |
| 11,914,674 B2* | 2/2024 | Zadeh | ..... G06N 3/044 |
| 12,001,509 B2 | 6/2024 | Kim et al. | |
| 12,072,998 B2* | 8/2024 | Nerurkar | ..... G06F 21/6227 |
| 12,136,038 B2 | 11/2024 | Bhalgat et al. | |
| 2019/0227980 A1 | 7/2019 | McMahan et al. | |
| 2021/0049298 A1 | 2/2021 | Suresh et al. | |
| 2021/0089887 A1 | 3/2021 | Johnson et al. | |
| 2021/0158211 A1 | 5/2021 | Talwar et al. | |
| 2021/0295201 A1 | 9/2021 | Kim et al. | |
| 2021/0374605 A1 | 12/2021 | Qian et al. | |
| 2022/0231648 A1 | 7/2022 | Li et al. | |
| 2022/0318412 A1 | 10/2022 | Guo et al. | |
| 2023/0351042 A1 | 11/2023 | De et al. | |

OTHER PUBLICATIONS

Palanisamy, et al., "Group privacy-aware disclosure of association graph data," 2017 IEEE International Conference on Big Data (Big Data), Jan. 15, 2018, 10 pages; https://ieeexplore.ieee.org/abstract/document/8258028.

WIPO International Search Report with Written Opinion of the ISA mailed in PCT/CA2023/050724 dated Aug. 4, 2023, 10 pages.

Abadi, et al., "Deep Learning with Differential Privacy," ACM SIGSAC Conference on Computer and Communications Security, arXiv:1607.00133, Oct. 25, 2016, 14 pages; https://systems.cs.columbia.edu/private-systems-class/papers/Abadi2016Deep.pdf.

Abowd, et al., "The U.S. Census of Bureau Adopts Differential Privacy," 24th ACM SIGKDD International Conference on Knowledge Discovery & Data Mining, ISBN 9781450355520, Aug. 2018, 3 pages; https://core.ac.uk/download/pdf/219376854.pdf.

Adnan, et al., "Federated Learning and Differential Privacy for Medical Image Analysis," Scientific Reports Feb. 4, 2022, 10 pages; https://www.nature.com/articles/s41598-022-05539-7.pdf.

Andrew, et al., "Differentially Private Learning with Adaptive Clipping," Advances of Neural Information Processing Systems arXiv:1905.03871, May 9, 2022, 12 pages; https://arxiv.org/pdf/1905.03871.pdf.

Bagdasaryan, et al., "Differential Privacy has Disparate Impact on Model Accuracy," Advances in Neural Information Processing Systems, 2019, 10 pages; https://proceedings.neurips.cc/paper/2019/file/fc0de4e0396fff257ea362983c2dda5a-Paper.pdf.

Bu, et al., "On the Convergence and Calibration of Deep Learning with Differential Privacy," arXiv preprint arXiv:2106.07830, Jun. 15, 2021, 26 pages; https://arxiv.org/pdf/2106.07830.pdf.

Buolamwini, et al., "Gender Shades: Intersectional Accuracy Disparities in Commercial Gender Classification," 1st Conference on Fairness, Accountability, and Transparency, Jan. 21, 2018, 15 pages; https://proceedings.mlr.press/v81/buolamwini18a/buolamwini18a.pdf.

Carlini, et al., "The Secret Sharer: Evaluating and Testing Unintended Memorization in Neural Networks," 28th USENIX Security Symposium (USENIX Security 19), arXiv:1802.08232, Jul. 16, 2019, 19 pages; https://arxiv.org/pdf/1802.08232.pdf.

Chang, et al., "On the Privacy Risks of Algorithmic Fairness," 2021 IEEE European Symposium on Security and Privacy (EuroS P), arXiv:2011.03731, Apr. 7, 2021, 12 pages; https://arxiv.org/pdf/2011.03731.pdf.

Chaudhuri, et al., "Differentially Private Empirical Risk Minimization," Journal of Machine Learning Research, arXiv:0912.0071, Feb. 16, 2011, 40 pages; https://arxiv.org/pdf/0912.0071.pdf.

Chen, et al., "Understanding Gradient Clipping in Private SGD: A Geometric Perspective," Advances in Neural Information Processing Systems, arXiv:2006.15429, Mar. 18, 2021, 10 pages; https://proceedings.neurips.cc/paper/2020/file/9ecff5455677b38d19f49ce658ef0608-Paper.pdf.

Choquette-Cho, et al., "CaPC Learning: Confidential and Private Collaborative Learning," International Conference on Learning Representations, arXiv:2102.05188, Mar. 19, 2021, 23 pages; https://arxiv.org/pdf/2102.05188.pdf.

Chouldechova, et al., "A Snapshot of the Frontiers of Fairness in Machine Learning," Communications of the ACM, Apr. 2020, 10 pages; https://cacm.acm.org/magazines/2020/5/244336-a-snapshot-of-the-frontiers-of-fairness-in-machine-learning/fulltext.

Dwork, et al., "Calibrating Noise to Sensitivity in Private Data Analysis," Theory of Cryptography Conference TCC 2006, 20 pages; https://www.researchgate.net/publication/225124717_Calibrating_Noise_to_Sensitivity_in_Private_Data_Analysis.

Ekstrand, et al., "Privacy for All: Ensuring Fair and Equitable Privacy Protections," 1st Conference on Fairness, Accountability, and Transparency, vol. 81 of Proceedings of Machine Learning Research, 2018, 13 pages; http://proceedings.mlr.press/v81/ekstrand18a/ekstrand18a.pdf.

Farrand, et al., Neither Private Nor Fair: Impact of Data Imbalance on Utility and Fairness in Differential Privacy, in Proceedings of the 2020 Workshop on Privacy-Preserving Machine Learning in Practice, arXiv:2009.06389, Oct. 3, 2020, 5 pages; https://arxiv.org/pdf/2009.06389.pdf.

Gentry, "Fully Homomorphic Encryption Using Ideal Lattices," Proceedings of the Forty-First Annual ACM Symposium on Theory of Computing, May 31, 2009, 10 pages; https://www.cs.cmu.edu/~odonnell/hits09/gentry-homomorphic-encryption.pdf.

Hutchison, "A Stochastic Estimator of the Trace of the Influence Matrix for Laplacian Smoothing Splines," Communications in Statistics—Simulation and Computation, 1990, 18 pages; https://www.researchgate.net/publication/245083270_A_stochastic_estimator_of_the_trace_of_the_influence_matrix_for_Laplacian_smoothing_splines.

Jagielski., et al., "Differentially Private Fair Learning," Proceedings of the 36th International Conference on Machine Learning, arXiv:1812.02696, May 31, 2019, 31 pages; https://arxiv.org/pdf/1812.02696.pdf.

Jaiswal, et al., "Privacy Enhanced Multimodal Neural Representations for Emotion Recognition," Proceedings of the AAAI Conference on Artificial Intelligence, arXiv:1910.13212, Oct. 29, 2019, 8 pages; https://arxiv.org/pdf/1910.13212.pdf.

Kalra, et al., "ProxyFL: Decentralized Federated Learning through Proxy Model Sharing," arXiv preprint arXiv:2111.11343, Nov. 22, 2021, 15 pages; https://arxiv.org/pdf/2111.11343.pdf.

Le Quy, et al., "A Survey on Datasets for Fairness-Aware Machine Learning," WIREs Data Minig and Knowledge Discovery, arXiv:2110.00530, Jan. 21, 2022, 56 pages; https://arxiv.org/pdf/2110.00530.pdf.

McMahan, et al., "Communication-Efficient Learning of Deep Networks from Decentralized Data," in Proceedings of the 20th International Conference on Artificial Intelligence and Statistics (AISTATS), arXiv:1602.05629, Feb. 28, 2017, 11 pages, https://arxiv.org/pdf/1602.05629.pdf.

Mehrabi, et al., "A Survey on Bias and Fairness in Machine Learning," ACM Computing Surveys, arXiv:1908.09635, Jan. 25, 2022, 34 pages; https://arxiv.org/pdf/1908.09635.pdf.

Mironov, "Renyi Differential Privacy," 2017 IEEE 30th Computer Security Foundations Symposium (CSF), arXiv:1702.07476, Aug. 25, 2017, 13 pages; https://arxiv.org/pdf/1702.07476.pdf.

Mironov, et al., "Renyi Differential Privacy of the Sampled Gaussian Mechanism," arXiv preprint arXiv:1908.10530, Aug. 28, 2019, 14 pages; https://arxiv.org/pdf/1908.10530.pdf.

Mozannar, et al., "Fair Learning with Private Demographic Data," International Conference on Machine Learning, arXiv:2002.11651, Jul. 13, 2020, 37 pages; https://arxiv.org/pdf/2002.11651.pdf.

Pichapati, et al., "AdaCliP: Adaptive Clipping for Private SGD," CoRR, arXiv:1908.07643, Oct. 23, 2019, 19 pages; https://arxiv.org/pdf/1908.07643.pdf.

Pujol, et al., "Fair Decision Making Using Privacy-Protected Data," Proceedings of the 2020 Conference on Fairness, Accountability, and Transparency, arXiv:1905.12744, Jan. 24, 2020, 12 pages; https://arxiv.org/pdf/1905.12744.pdf.

Tran, et al., "Differentially Private and Fair Deep Learning: A Lagrangian Dual Approach," Proceedings of the AAAI Conference on Artificial Intelligence, arXiv:2009.12562, Sep. 26, 2020, 20 pages; https://arxiv.org/pdf/2009.12562.pdf.

Tran, et al., "Differentially Private Empirical Risk Minimization Under the Fairness Lens," Advances in Neural Information Pro-

(56) References Cited

OTHER PUBLICATIONS cessing Systems, vol. 34, May 21, 2021, 11 pages, https://proceedings.neurips.cc/paper/2021/file/e7e8f8e5982b3298c8addedf6811d500-Paper.pdf.

Xu, et al., "Removing Disparate Impact on Model Accuracy in Differentially Private Stochastic Gradient Descent on Model Accuracy," Proceedings of the 27th ACM SIGKDD Conference on Knowledge Discovery & Data Mining, arXiv:2003.03699, Sep. 27, 2020, 14 pages; https://arxiv.org/pdf/2003.03699.pdf.

Yu, et al., "Differentially Private Model Publishing for Deep Learning," IEEE Symposium on Security and Privacy (SP), arXiv:1904.02200, Dec. 19, 2019, 20 pages; https://arxiv.org/pdf/1904.02200.pdf.

\* cited by examiner

IDENTIFYING AND MITIGATING DISPARATE GROUP IMPACT IN DIFFERENTIAL-PRIVACY MACHINE-LEARNED MODELS

CROSS-REFERENCE TO RELATED APPLICATIONS

This application claims the benefit of U.S. Provisional Application No. 63/346,812, filed May 27, 2022, and U.S. Provisional Application No. 63/350,333, filed Jun. 8, 2022, the contents of each of which are hereby incorporated by reference in the entirety.

BACKGROUND

This disclosure relates generally to training computer models with privacy considerations, and more particularly to identifying and mitigating differences between groups in differential-privacy training approaches.

In many applications, such as in medicine or finance, protecting individual user privacy presents important social, ethical, and legal considerations. When training computer models in which information about parameters of the trained model is shared with other entities, some information about the underlying training data may be revealed through the model parameters. For example, during the model training process, the model update gradients used to modify parameters of the model are based on the underlying information and output labels of the training data, such that some information about the underlying data may be revealed in the model update gradients. While such gradients improve the performance of the model, it may reveal information about the character of inputs and labeled outputs of the underlying training data samples. As one example, the privacy cost may be measured by its "differential privacy," which may measure the amount of information revealed about a data sample when its data is added to a group of other data samples. Differential-privacy (DP) model training approaches may limit the extent to which private data of individual data samples is revealed by clipping per-sample gradients and adding noise, reducing (and bounding) the extent to which individual sample contributions may be determined from overall model update gradients. In environments in which the model is shared with other entities, and particularly where a model may be jointly trained with other entities, each of which may have its own private training data, privacy-preserving training enables these entities to share models and/or model training information while protecting private data privacy and measuring the privacy cost of such sharing.

However, although individual data samples may appear to neutrally be accounted for in this approach (e.g., measuring per-sample privacy costs), these approaches may nonetheless result in differences when privacy costs are compared between groups of data samples relating to different labels (e.g., underrepresented or overrepresented data types in the training data set). Data samples for one group (e.g., underrepresented group labels) may suffer higher privacy costs compared to data samples of another group when using existing DP model training approaches.

In addition, existing techniques may not effectively measure such group-group costs, posing additional challenges to identifying and correcting such group-group differences in either privacy cost or model accuracy.

SUMMARY

This disclosure discusses approaches to improve measurement of group privacy costs as well as an improved differential-privacy training approach. To evaluate and measure the effect of privacy-aware training at the group level, privacy costs for individual groups may be measured (and relatively compared) by evaluating the extent to which privacy-aware training processes affect the direction of training gradients for that group. In addition, a modified differential-privacy ("DP") training process provides per-sample gradient adjustment (e.g., clipping) with parameters that may be adaptively modified for different data batches, reducing gradient direction errors for each training iteration (e.g., at the training batch level) without requiring samples to be discarded, overly compressing batch gradients, or data samples to include group labels.

During training of a computer model, in each iteration a batch of training data samples is selected and applied to current parameters of the model to determine per-sample training gradients. These gradients may represent the "private" gradients without privacy processes. In one embodiment, the training process may modify the per-sample gradients with respect to a reference bound and a clipping bound. The clipping bound may represent a maximum magnitude for a per-sample gradient in the training process, and the reference bound may represent a reference bound for adjusting and/or scaling the per-sample gradients. For a per-sample gradient having a magnitude (e.g., a norm) higher than the reference bound, the per-sample gradient may be adjusted by scaling the per-sample gradient to the clipping bound. For a per-sample gradient having a magnitude lower than the reference bound, the pre-sample gradient may be adjusted based on a ratio of the clipping bound to the reference bound. Stated another way, a scaling factor may be determined for each per-sample gradient based on the higher of the reference bound or a magnitude of the per-sample gradient. Each per-sample gradient may then be adjusted based on a ratio of the clipping bound to the scaling factor. As a result, per-sample gradients above the reference bound may be adjusted to a magnitude corresponding to the clipping bound and per-sample gradients below the reference bound are adjusted to a magnitude according to a ratio of the clipping bound to the reference bound.

In addition, the reference bound may be updated in different training iterations (e.g., with different data batches). The reference bound may be increased or decreased in one embodiment based on the number of data samples above the reference bound, encouraging the reference bound to increase or decrease as the gradients may generally change over time as the model parameters are updated over training iterations. Noise may also be added to the reference bound update, adding further randomization to the training process.

After adjustment, the training gradients may be combined, and noise may be added to determine an adjusted batch gradient to be applied during training. This process may improve group-group disparities in an approach that maintains differential privacy guarantees and may do so without requiring group labels, discarding sample gradients, or learning scaling information as a fixed hyperparameter.

In further embodiments, group-group disparities in privacy costs may be determined by evaluating how the privacy-aware training process affects a direction of the training gradient for a batch. The per-sample gradients may be combined to an unadjusted batch gradient, representing the training gradient for the batch of data based on a training loss without privacy considerations. The adjusted batch gradient may also be determined based on the adjusted batch gradient reflecting the batch gradient after application of the privacy-aware training adjustment. The difference between the adjusted batch gradient and unadjusted batch gradient may be represented as a change in direction and a change in magnitude. Rather than directly evaluating differences between the unadjusted batch gradient and the adjusted batch gradient, the privacy costs on a group may be determined by evaluating the privacy cost with respect to a direction error between the unadjusted batch gradient and the adjusted batch gradient for the group given the change in direction due to the privacy-aware training.

In some embodiments, the relative privacy cost between two groups may be determined as excess training risk based on the extent to which the adjusted batch gradient modifies the direction of unadjusted batch gradient for one group gradient relative to another group gradient. The unadjusted per-sample gradients for each group may be combined to determine each group's unadjusted group gradient. The angle between the unadjusted group gradient is measured for each group with respect to the unadjusted batch gradient and the adjusted batch gradient (e.g., as a cosine), and the difference in angle for each group caused by the training process may be determined. When the training process causes a difference in angle that differs between the groups, it indicates disparate impact of the training process on the two groups. By measuring the change in angle due to the privacy-aware adjustments on a group basis and comparing the change across groups, the disparate effects of the privacy-aware training across the groups is determined.

The excess risk for a group may then be used to affect model training. For example, a model training method may be selected based on the group-related error, the training gradient may be applied when the error is below a threshold, or an accumulated group privacy cost may be accumulated across training iterations and used to determine when to complete the training process.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
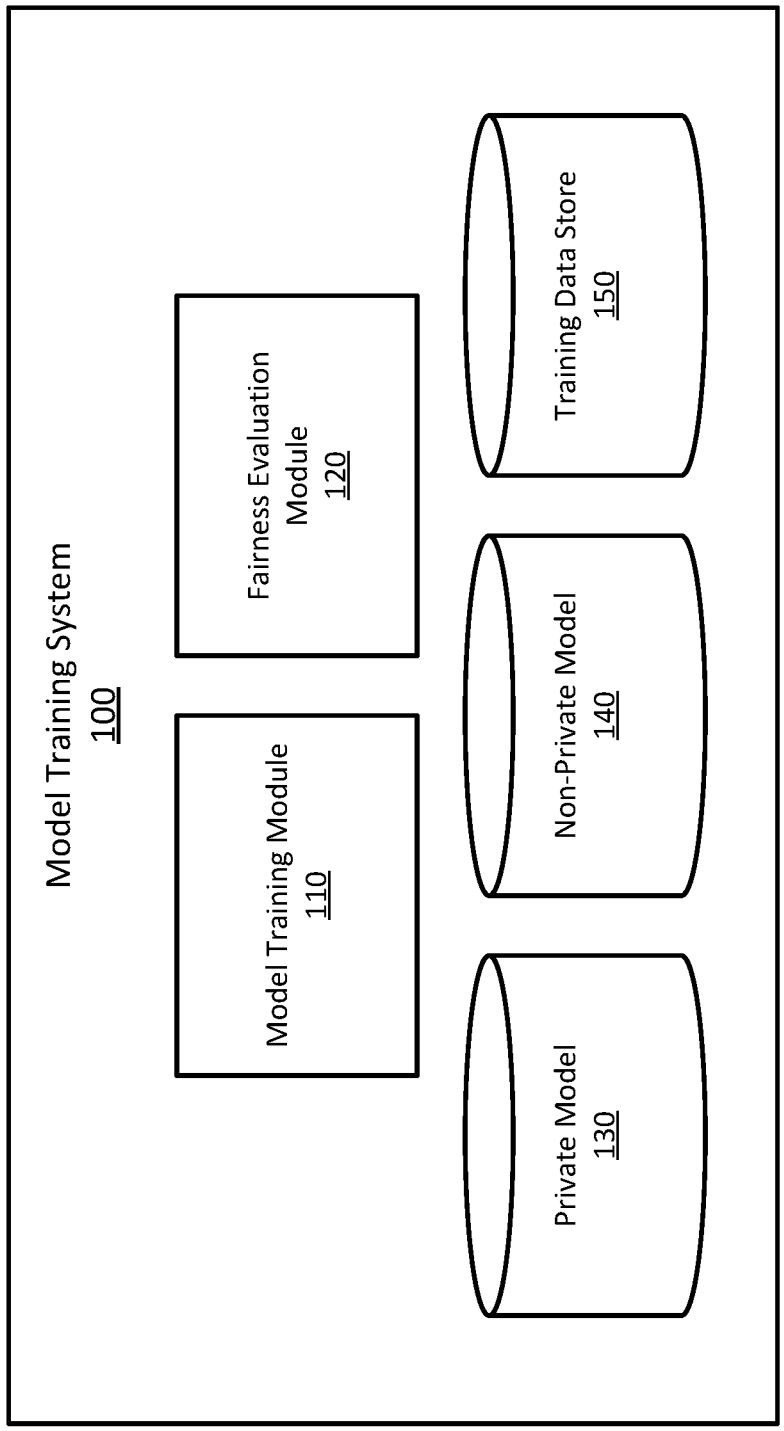
FIG. 1 illustrates a model training system, according to one embodiment.

FIG. 1 illustrates a model training system 100, according to one embodiment. The model training system 100 includes components for training a computer model with a privacy-aware training process. A "privacy-aware" training process is a process which may provide for measurement or boundaries (e.g., an upper or lower limit) on the privacy cost of the training, reflecting the extent to which training the computer model reveals private information about the training data. In general, privacy-aware training processes may aim to balance the privacy cost of training while maintaining high performance of the trained model. One framework, differential privacy ("DP"), measures the extent to which addition or removal of an item (here, a training data sample) changes the range of outputs for a process (here, the model training process).

Figure 2:
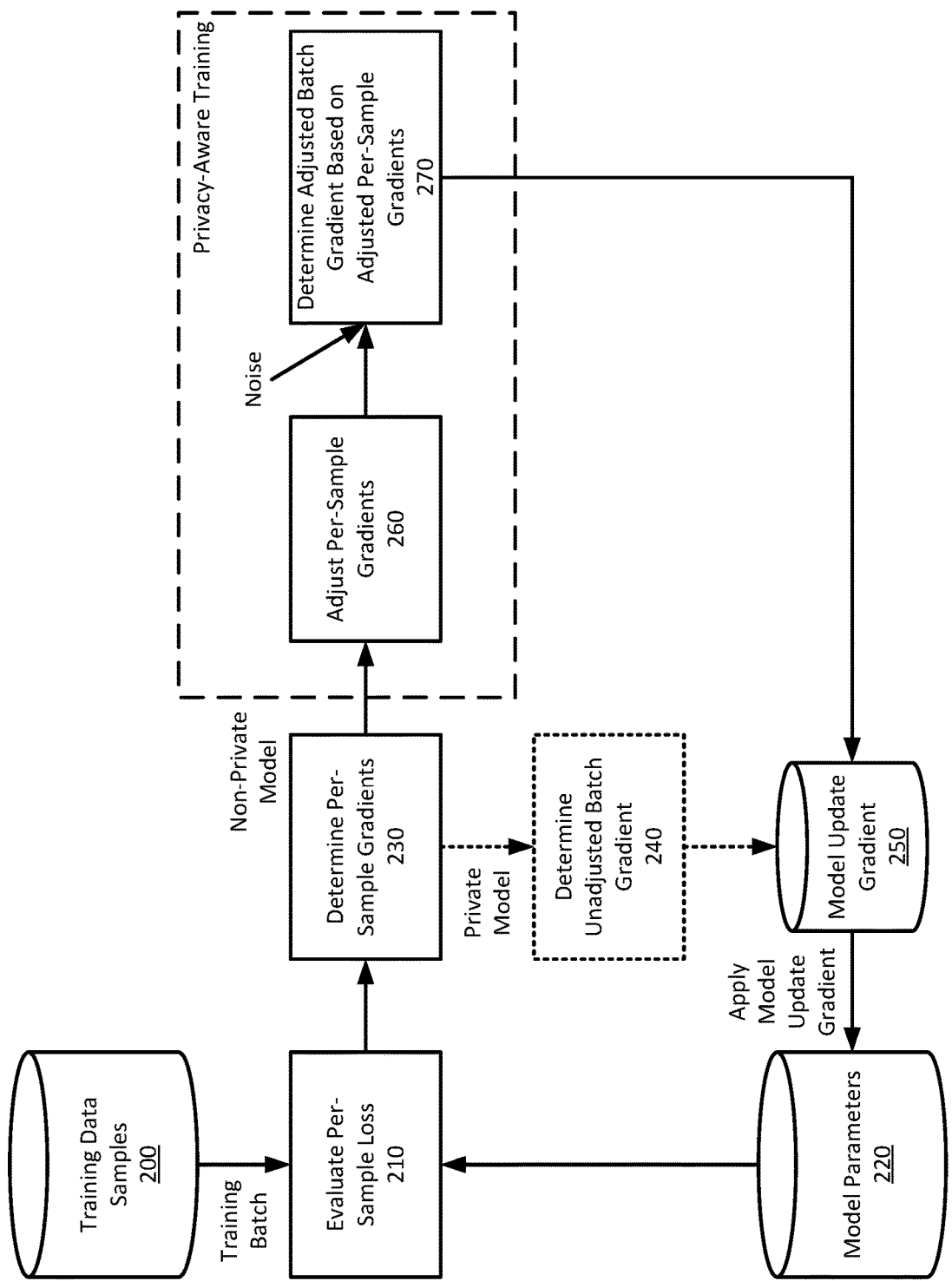
FIG. 2 illustrates an example of model training with privacy-aware training components, according to one embodiment.

A model training module 110 trains a computer model based on data samples in a training data store 150. In some embodiments, the model training system 100 may train a private model 130 and a non-private model 140. The model training module 110 applies a privacy-aware training process to learn parameters for a non-private model 140. The non-private model 140 is "non-private" in that, because it was trained with a privacy-aware training process, the privacy cost is reduced (and ideally, minimized) and may be measurable relative to training processes that do not include privacy-aware components. In some embodiments, the model training module 110 may also train a private model 130 for performance comparison with the non-private model 140. As such, private model 130 represents a model in which the model is trained without additional privacy-preserving aspects. FIG. 2 illustrates one example of the training process in which privacy-aware training approaches may be applied.

The particular structure and types of computer models that may be used vary in different embodiments and includes many types of models that may be trained with a loss function. In general, the model represents a function for processing an input x to an output y according to the parameters of the model. For examples of this disclosure, the input x may be a feature vector that may describe features of the input x along a number of dimensions d and the output y may be a binary label (e.g., the output of the model is a classification with respect to the label). The training data stored in the training data store 150 is referred to as a data set D and includes a number n of data samples having an input, an output label, and may also include a protected group attribute a.

The protected group attribute may be a value from a set of possible values K for the protected group attribute, such that each data sample i has a value $a_i$ belonging to a set of protected group attribute values K. The protected group attribute is an attribute that may vary across different data samples, and in various applications represent legally or ethically protected characteristics, such as a race, sex, gender, religion, and so forth for individual persons whose information is represented as an input x with a labeled output y. The protected group attribute may also be referred to as a group label. In various embodiments, the various protected group attribute values (e.g., each member of K) may occur in different proportions in the training data store 150, such that data samples for each protected group attribute may occur in different proportions in the training data set as a whole, such that certain groups may be over- or under-represented in the training data store 150. In some embodiments, for training and applying a model, the group labels may be absent, such as when a model is trained and used for inference; as discussed below, the model training module 110 may apply a privacy-aware training process that improve group-group privacy cost disparities without requiring the training data to include group labels. The fairness evaluation module 120 may evaluate fairness of model training with respect to effects on different groups, and particularly to whether a training process causes disparate privacy costs across groups. To do so, the fairness evaluation module 120 may have access to the group labels in the training data store 150 to measure privacy costs on a group level.

As a more formal description, each data sample in the examples of this disclosure may thus be represented as ($x_i$, $a_i$, $y_i$), where $x_i \in \mathbb{R}^d$ is a feature vector, $y_i \in \{0, 1\}$ is a binary label, and $a_i \in [K]$ refers to a protected group attribute which partitions the data. The group label $a_i$ can optionally be an attribute in $x_i$, the label value $y_i$, or a separate property that is not an input or an output. The group of training data samples having a particular protected group attribute k may also be referred to as $D_k$, and formally defined as: $D_k = \{(x_i, a_i, y_i) \in D | a_i = k\}$.

In general, the model training includes a loss function that may be evaluated with respect to individual data samples and used to update model parameters by applying gradients to the model parameters, such as via stochastic gradient descent. A loss function evaluated at an output layer may be backpropagated to determine parameter updates of earlier layers to determine parameter updates as a gradient for the model as a whole. Accordingly, embodiments of the invention may include various computer model types having parameters that may be updated based on model parameter update gradients. Such models include neural networks, convolutional networks, and other types of models. As such, the training and fairness evaluation approaches discussed herein may be applied to a large number of types of model architectures and used for various specific applications. In general, these approaches may be applied to model architectures in which model parameter update gradients may be represented as a vector having a direction and a magnitude, and in which model parameter update gradients (e.g., relating to different data samples) may be combined.

FIG. 2 illustrates an example of model training with privacy-aware training components, according to one embodiment. In general, the model training process aims to determine an optimal set of model parameters θ for the model that, together, define a function for converting an input vector to an output (in this example from zero to one), which may be defined as: $f_\theta: \mathbb{R}^d \to [0, 1]$. The training process may be described as an empirical risk minimization (ERM) problem with respect to the objective (e.g., increasing accuracy of output label prediction), in which a per-sample loss $\ell: [0,1] \times \{0,1\} \to \mathbb{R}$, with the optimal model minimizing the total loss $\mathcal{L}$ across the training data samples:

$$\mathcal{L}(\theta; D) = \frac{1}{n} \sum_{i \in D} \ell(f_\theta(x_i), y_i).$$

To do so while providing for privacy, optimized parameters must be determined while minimizing revealed private information. As such, while one training goal is to minimize the loss thus providing utility to the model, the privacy-aware training also aims to reduce privacy costs of the training, and particularly to do so without disparate privacy costs across different groups as further discussed below.

The computer model may be trained in multiple iterations, such that each iteration modifies the model parameters to identify optimal (or at least local optima) model parameters for the training data set. To train the model in one iteration, the process may initially identify (e.g., select) a set of training items from the training data samples 200 (e.g., from the training data store 150) as a training batch to iteratively train the model parameters 220. In each iteration, the batch of training data samples is evaluated with current model parameters 220 to determine a model update gradient 250 for the batch and apply the model update gradient to update the model parameters 220, for example via stochastic gradient descent.

For each training data sample, the training data may be evaluated 210 with the current model parameters to identify a per-sample loss based on a loss function $\ell$ applied to the difference between the model's prediction with the current parameters and the known label for the datapoint ($y_i$). In some embodiments, the loss function may be numerical difference between the predicted value and the labeled value, and in other embodiments may include different ways to evaluate the significance of the difference between the prediction and the labeled values. The loss function is differentiable with respect to the parameters of the model, such that per-sample gradients for the model parameters are determined 230 for the sample, describing how the parameters of the model may be modified to reduce the loss for that sample.

For a private model, the per-sample gradients may be combined to determine an unadjusted batch gradient 240 for the model, such that the per-sample gradients may be used directly as the model update gradient 250 to improve the model parameters without consideration of the privacy cost. The per-sample gradients may be combined, for example, by averaging or summing the gradient vectors for the training data samples in the batch. As discussed further below, in one embodiment for evaluating the fairness of privacy-aware training, the unadjusted batch gradient may be determined and compared with the batch gradient determined after application of the privacy-aware components (termed an adjusted batch gradient), permitting evaluation of the effects of the privacy-aware components on group privacy costs.

The adjusted batch gradient for differential-privacy training processes further modifies the per-sample gradients to decrease the extent to which per-sample information is revealed by the total batch gradient. First, each per-sample gradient may be adjusted 260 before combination, and second noise (such as Gaussian noise) may be added to the adjusted per-sample gradients (or a combination thereof) to further obscure the contribution of a training data item. When adjusting 260 the per-sample gradients, different per-sample gradients may be adjusted differently, such that the gradients for different samples may be adjusted differently. For example, gradients having a magnitude (which may also be termed a norm) above a threshold may be discarded, clipped, or otherwise have its contribution to the batch reduced. As one example, such gradients above a threshold norm may be scaled to a maximum magnitude of a per-sample gradient. The adjusted batch gradient may then be used as the model update gradient 250 for updating model parameters of the non-private model. By adding adjustments to the per-sample gradients and adding noise, the adjusted batch gradient has reduced direct effect of the loss function but may significantly decrease measurable DP privacy costs.

In many cases, however, per-sample gradients for different groups may have similar gradients, such that the data samples associated with one group are more likely to exceed the threshold and have their gradients adjusted. As a result, the adjusted batch gradient for the training batch may affect the effective contribution from each group, which may result in disparate impacts in model accuracy or excess risk for each group, as discussed below.

Figure 3:
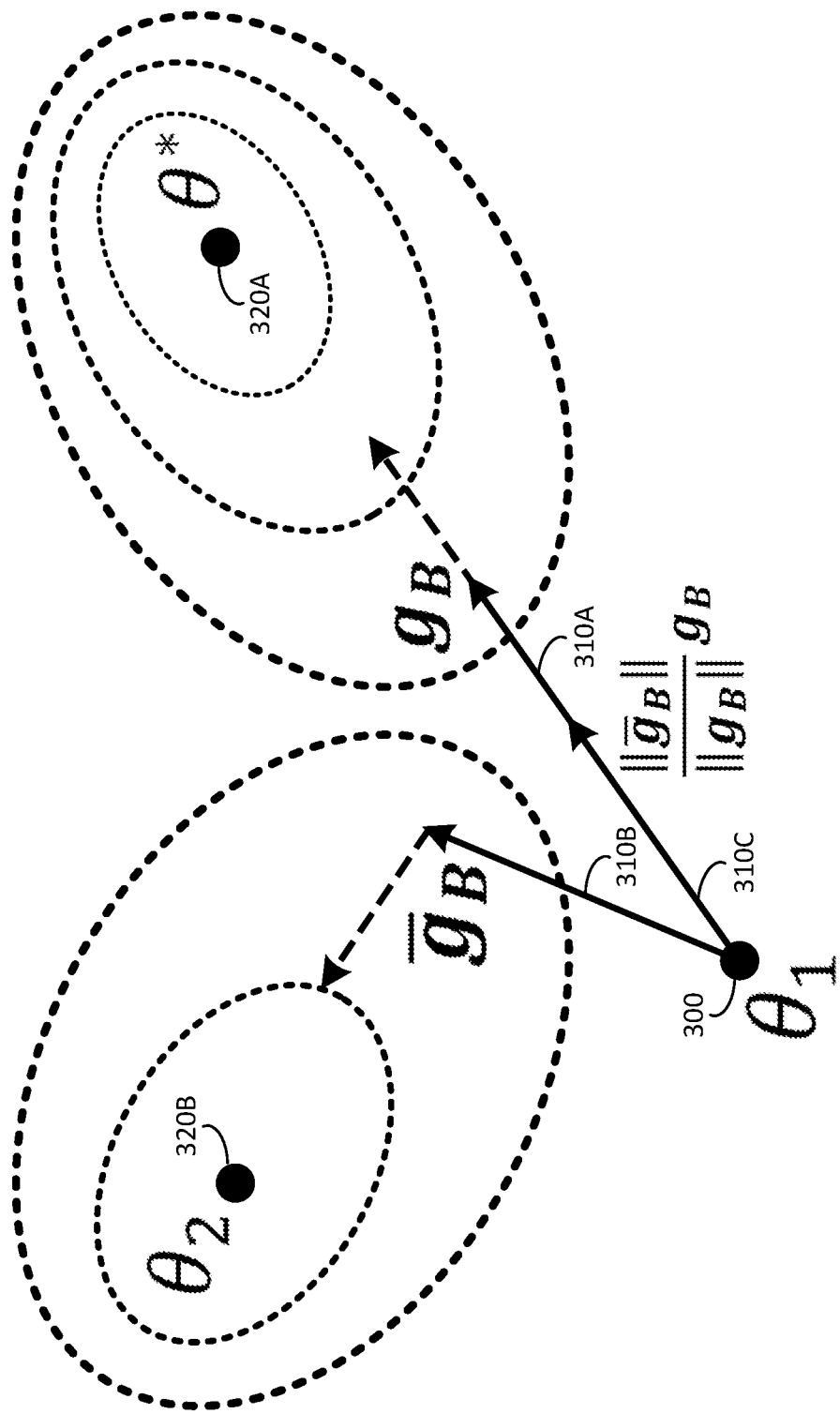
FIG. 3 illustrates a comparison of the unadjusted batch gradient and the adjusted batch gradient with respect to possible model parameter optimizations towards different local minima.

FIG. 3 illustrates a comparison of the unadjusted batch gradient and the adjusted batch gradient with respect to possible model parameter optimizations towards different local minima. In the example of FIG. 3, different positions represent different values for model parameters in a two-dimensional space, with dotted lines representing a "topography" towards two minima, a first local minima 320A and a second local minima 320B. The privacy-aware training components may result in the adjusted batch gradient differing from the unadjusted batch gradient in both a magnitude and a direction. In the example of FIG. 3, at the beginning of a training iteration, the model may have a current set of model parameters 300.

For a particular training batch, FIG. 3 illustrates various batch gradients 310A-C. The first batch gradient 310A represents an unadjusted batch gradient $g_B$ and the second batch gradient 310B represents an adjusted batch gradient $\bar{g}_B$. However, each of the batch gradients may result in iterations towards different optimizations as shown in FIG. 3. The unadjusted batch gradient shown as first batch gradient 310A may lead to local minima 320A of the model parameters, while the adjusted batch gradient shown as second batch gradient 310B may lead to local minima 320B. As such, the per-sample adjustments that provide privacy to the training process may also lead to different (and often less optimal) model parameters.

To better represent and understand the effect of the adjustment on the batch optimization, and particularly on group privacy disparities, rather than directly comparing the unadjusted batch gradient to the adjusted batch gradient, differences between these batch gradients is decomposed, such that the adjusted batch gradient is considered as a magnitude adjustment, and a change in direction to the unadjusted batch gradient. The magnitude of the adjustment may be represented as a ratio of the batch gradient norms: $\|\bar{g}_B\|/\|g_B\|$, while the change in direction may be represented as an orthogonal matrix $M_B$. The third batch gradient 310C illustrates the application of the magnitude adjustment to the unadjusted batch gradient, but without application of the change in direction. As such, the orthogonal matrix $M_B$, applied to the unadjusted batch gradient $g_B$, is colinear to the adjusted batch gradient $\bar{g}_B$. Stated formally, the adjusted batch gradient is equal to the unadjusted batch gradient with the magnitude and direction changes applied:

$$\bar{g}_B = M_B\left(\frac{\|\bar{g}_B\|}{\|g_B\|}g_B\right)$$

As shown in the example of FIG. 3, when the magnitude is changed but direction is not, the model parameters may still be updated towards the same local minima 320A. The change in magnitude may be similar to a change in learning rate of the batch gradient, effectively modifying the step size of the gradient for the iteration. By decomposing the batch adjustment to a magnitude and a change in direction, the effects of the adjustment as they affect group privacy disparities may be evaluated based on the change in direction as further illustrated in FIG. 4 and discussed below.

Figure 4:
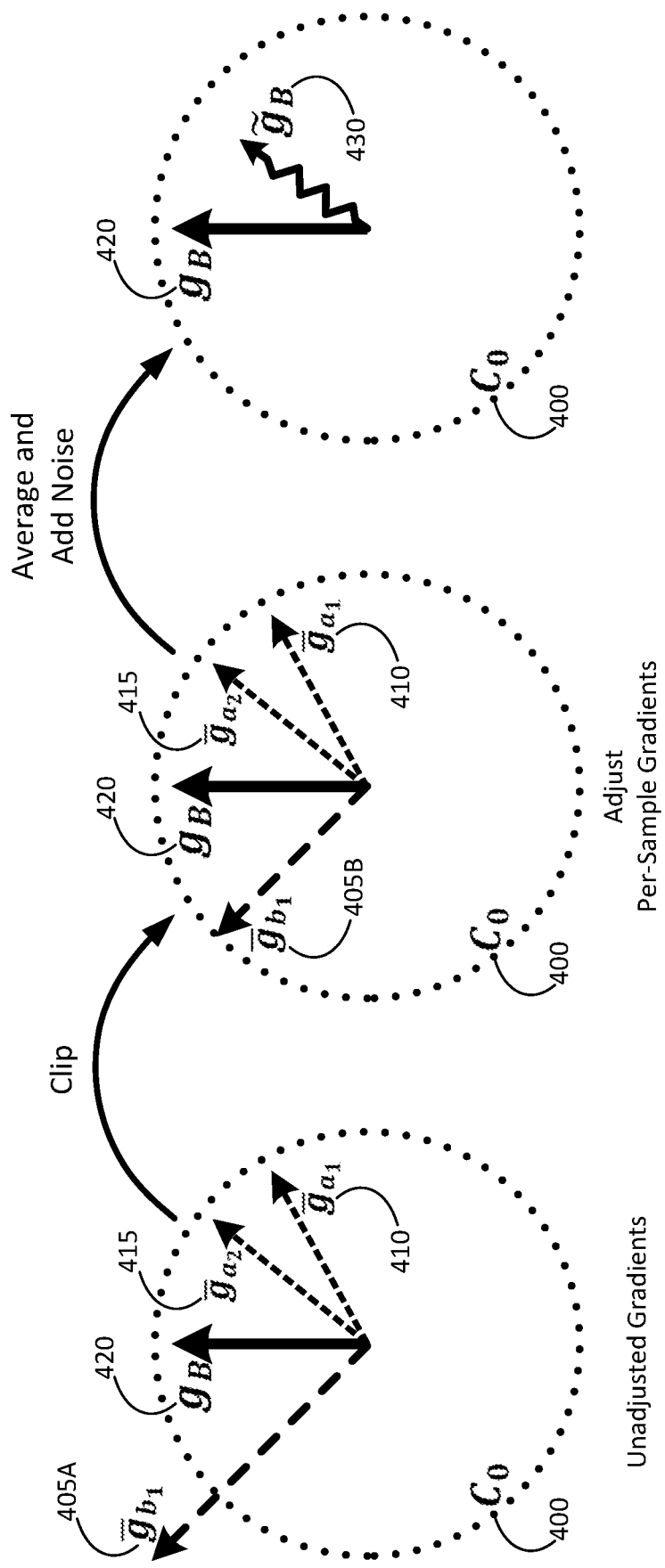
FIG. 4 shows an example of per-sample adjustment affecting group contributions to a batch gradient.

FIG. 4 shows an example of per-sample adjustment affecting group contributions to a batch gradient. In this example, per-sample gradients that exceed a "clipping bound" (i.e., have a higher norm/magnitude than a maximum) are reduced to a magnitude of a clipping bound 400.

Initially, a group of per-sample gradients are determined based on the training data and respective loss functions as discussed above. The per-sample gradients in this example includes a first per-sample gradient 405A that corresponds to a first group label and has a norm higher than the clipping bound 400. A second per-sample gradient 410 and third per-sample gradient 415 correspond to a second group label. In this example of a privacy-aware training process, the adjustment reduces the magnitude of gradient above the clipping bound 400, such that the first gradient 405A is reduced or "clipped" to the adjusted first gradient 405B. The adjustment for the second per-sample gradient 410 and third per-sample gradient 415 may be unaffected by the adjustment. As shown in this example, the clipping process may thus reduce the magnitude of the first per-sample gradient belonging to the first group, affecting its contribution to the adjusted batch gradient 430 relative to an unadjusted batch gradient 420. In many cases, the per-sample gradients for different groups may be more or less likely to exceed the clipping bound, causing, for example, the gradients of one group to be disparately impacted by the adjustment process. This may be a particular problem when the relative frequency of the data samples differs for different groups, particularly for situations in which underrepresented groups are both fewer in number and more likely to have larger per-sample gradients. The effect of the privacy-aware training process on a group may be determined based on the change in the batch gradient to determine whether privacy costs are, in practice, different for groups during training.

Group Privacy Fairness Evaluation

The fairness of privacy costs to different groups, including comparisons of group-group disparities, may be evaluated based on the change in direction in the batch gradient caused by the introduction of the per-sample adjustments. In some instances, the per-sample adjustments for a DP training process may also be referred to as "clipping," and the resulting adjusted per-sample gradient as a "clipped" gradient as shown in FIG. 4. These costs may be evaluated by a module during or after training, for example, by the fairness evaluation module 120.

For trained models, privacy costs may be evaluated with respect to "accuracy parity" for a group and with respect to "excessive risk" over the course of training. Accuracy parity may measure the difference in classification accuracy, while excess risk may measure the privacy costs to a group over the course of training.

Accuracy parity $\pi$ for a particular model may be measured for a data set $D_k$ of group label k based on the accuracy difference and expectation for the model trained with privacy concerns:

$$\pi(\theta, D_k) = acc(\theta^*; D_k) - \mathbb{E}_{\tilde{\theta}}[acc(\tilde{\theta}; D_k)]$$

In which $\theta^*$ represents the "private" model parameters that may be learned without privacy considerations, $\tilde{\theta}$ represents the non-private model parameters learned with a privacy-aware process, and the expectation $\mathbb{E}_{\tilde{\theta}}$ may be taken over the randomness of the privacy-aware training process. Accuracy parity for a particular group k may be abbreviated as $\pi_k$, and an accuracy "privacy cost gap" between two groups a, b may be defined as $\pi_{a,b} = |\pi_a - \pi_b|$.

As another measurement, the excess risk R for a group $D_k$ (which together may be abbreviated $R_k$) may characterize the privacy risk to the group during the course of training, such that the privacy cost may be characterized with respect to the loss functions:

$$R(\theta, D_k) = \mathbb{E}_{\tilde{\theta}}[\mathcal{L}(\tilde{\theta}; D_k) - \mathcal{L}(\theta^*; D_k)]$$

This characterization of privacy fairness as excess risk may be used to aid in evaluating causes of unfairness to a group during training by evaluating the components of the risk in terms of the effects on the loss caused by the privacy-aware training. The excess risk measured for a particular group k may also be abbreviated as $R_k$. As with the privacy cost gap, an excess risk gap between two groups a, b may be defined as: $R_{a,b} = |R_a - R_b|$.

Differential privacy (DP) is a widely used framework for quantifying the privacy consumed by a data analysis procedure. Formally, it describes privacy relates to data points D, and a probabilistic function M, or mechanism, acting on datasets. The mechanism is ($\epsilon$, $\delta$)-differentially private if for all subsets of possible outputs S⊆Range(M), and for all pairs of databases D and D' that differ by the addition or removal of one element, $$Pr[M(D) \in S] \leq \exp(\epsilon) Pr[M(D') \in S] + \delta$$

Which may indicate privacy costs bounded by measures of $\epsilon$ and $\delta$.

The two most significant steps in the privacy-aware training discussed above, per-sample adjustment (e.g., clipping) and adding noise, can impact the learning process disproportionately across groups. To determine this cost with additional precision and to do so for particular groups (also enabling measurement of disparate privacy costs across groups), the excess cost for privacy-aware training may be decomposed to different terms, including a term relating to the effect of the adjustment (e.g., clipping) process on the privacy cost. To more precisely measure this cost, the clipping term is further decomposed to measure a directional change caused by the adjustment to more accurately determine the effects of the training process and to do so computably at individual training iterations.

In calculating the excessive risk for a group $R_a$, the expected loss $\mathcal{L}(\theta; D_a)$ for the data points in a given group $D_a$ for schemes including sample adjustment and noise at a single iteration t for calculating updated model parameters for the next iteration ($\theta_{t+1}$) with a learning rate $\eta_t$ may be decomposed to a non-private term, a clipping term $R_a^{clip}$, and a noise term $R_a^{noise}$:

$$\mathbb{E}[\mathcal{L}(\theta_{t+1}; D_a)] \approx \mathcal{L}(\theta_t; D_a) - \eta_t \langle g_{D_a}, g_D \rangle + \quad \text{(non-private term)}$$

$$\frac{\eta_t^2}{2} \mathbb{E}[g_B^T H_\ell^a g_B]$$

$$+ \eta_t \langle g_{D_a}, g_D - \bar{g}_D \rangle + \frac{\eta_t^2}{2} (\mathbb{E}[\bar{g}_B^T H_\ell^a \bar{g}_B] - \quad (R_a^{clip})$$

$$\mathbb{E}[g_B^T H_\ell^a g_B])$$

-continued $$+ \frac{\eta_t^2}{2} Tr(H_\ell^a) C_0^2 \sigma^2 \quad (R_a^{noise})$$

The expectation $\mathbb{E}$ is evaluated with respect to the randomness of the DP mechanisms and batches of data. The non-private term is the same as it may be for non-private updates (e.g., application of stochastic gradient descent with an unadjusted batch update) and does not contribute to group-related the excessive risk. The clipping term ($R_a^{clip}$), is related to per-sample adjustments (e.g., clipping) and cancel when $\bar{g}_B = g_B$ for a batch. They involve gradients for the data points $g_{D_a}$ and Hessian $H_\ell^a$, averaged over datapoints belonging to group a. The final term accounting for the noise $R_a^{noise}$, depends on the scale of added noise measured by $\sigma^2$, as well as the trace of the Hessian, also called the Laplacian, averaged over $D_a$. As discussed above and shown in FIGS. 3 and 4, clipping may cause excessive risk, particularly to groups with samples having large gradient norms.

As discussed in FIGS. 3 and 4, the per-sample adjustments introduce two types of error to the clipped batch gradient. It typically has a different magnitude and is misaligned (e.g., has a different direction) compared to the unadjusted batch gradient (e.g., a private batch gradient for the same batch). At a high level, gradient misalignment poses a more serious problem to convergence than magnitude error, as illustrated in FIG. 3. Changing only the norm means gradient descent will still step towards the (local) minimum of the loss function, and any norm error can be compensated for by adapting the learning rate $\eta_t$. In contrast, a misaligned gradient could result in a step towards significantly worse regions of the loss landscape causing significant failures of convergence. Misaligned gradients add bias which compound over training, as underrepresented or complex groups are systematically adjusted by the process. For comparison, adding noise to the batch gradient does not add bias as noise errors tend to cancel out over training. By distinguishing magnitude and change of direction effects, the fairness evaluation quantifies the relative impact of these effects and how they contribute to the excessive risk.

To do so, the clipping term in the excessive risk evaluation can be approximated by decomposing it into components describing the magnitude and change in direction of the adjustment process; that is, in comparing the unadjusted batch gradient to the adjusted batch gradient. To perform these calculations, the fairness evaluation module 120 may calculate, in parallel, the unadjusted batch gradient and the adjusted batch gradient for a privacy-aware training process. In decomposing the excessive loss due to clipping $R_a^{clip}$ for group a at iteration t, for a model update process from $\theta_{t+1} - \theta_t$, the clipping loss is approximated as:

$$R_a^{clip} \approx \eta_t \langle g_{D_a}, \mathbb{E}\left[\left(1 - \frac{\|\bar{g}_B\|}{\|g_B\|}\right) g_B\right] \rangle + \frac{\eta_t^2}{2} \mathbb{E}\left[\left(\frac{\|\bar{g}_B\|^2}{\|g_B\|^2} - 1\right) g_B^T H_\ell^a g_B\right] \quad (R_a^{mag})$$

$$+ \eta_t \langle g_{D_a}, \mathbb{E}\left[\frac{\|\bar{g}_B\|}{\|g_B\|} (g_B - M_B g_B)\right] \rangle + \frac{\eta_t^2}{2} \mathbb{E}\left[\frac{\|\bar{g}_B\|^2}{\|g_B\|^2} ((M_B g_B)^T H_\ell^a (M_B g_B)) \quad (R_a^{dir})$$

$$- g_B^T H_\ell^a g_B)\right]$$

Equation 1

Where $g_{D_a}$ is an unadjusted group gradient for group a at iteration t; similarly $\bar{g}_{D_a}$ is an adjusted group gradient for group a (further discussed below). The respective group gradients may be determined similar to the batch gradient (e.g., by averaging or summing), but processing only the per-sample gradients belonging to the group, rather than all per-sample gradients in the batch. $H_\ell^a$ is the Hessian over group a, and $M_B$ is an orthogonal matrix, such that $\bar{g}_B$ and $M_B g_B$ are colinear. As such, the excess risk describing the privacy cost for the group as caused by direction error is determined based on a term reflecting the change in direction between the unadjusted batch gradient $g_B$ and the adjusted batch gradient $\bar{g}_B$, and may be calculated for individual batches in training iterations.

As a further approach for evaluating group-group differences, the angle of a group gradient with respect to the unadjusted batch gradient and the adjusted batch gradient may be determined, and a difference of these angles for different groups may inform whether the adjustment process (i.e., the privacy-aware training) has a disparate impact on the different groups. That is, it is expected that, as the unadjusted group gradient is likely to have a different angle relative to the adjusted and unadjusted batch gradients. However, comparing these differences between groups may reveal whether the adjustment process more-significantly affected the excess risk gap between groups.

Figure 5:
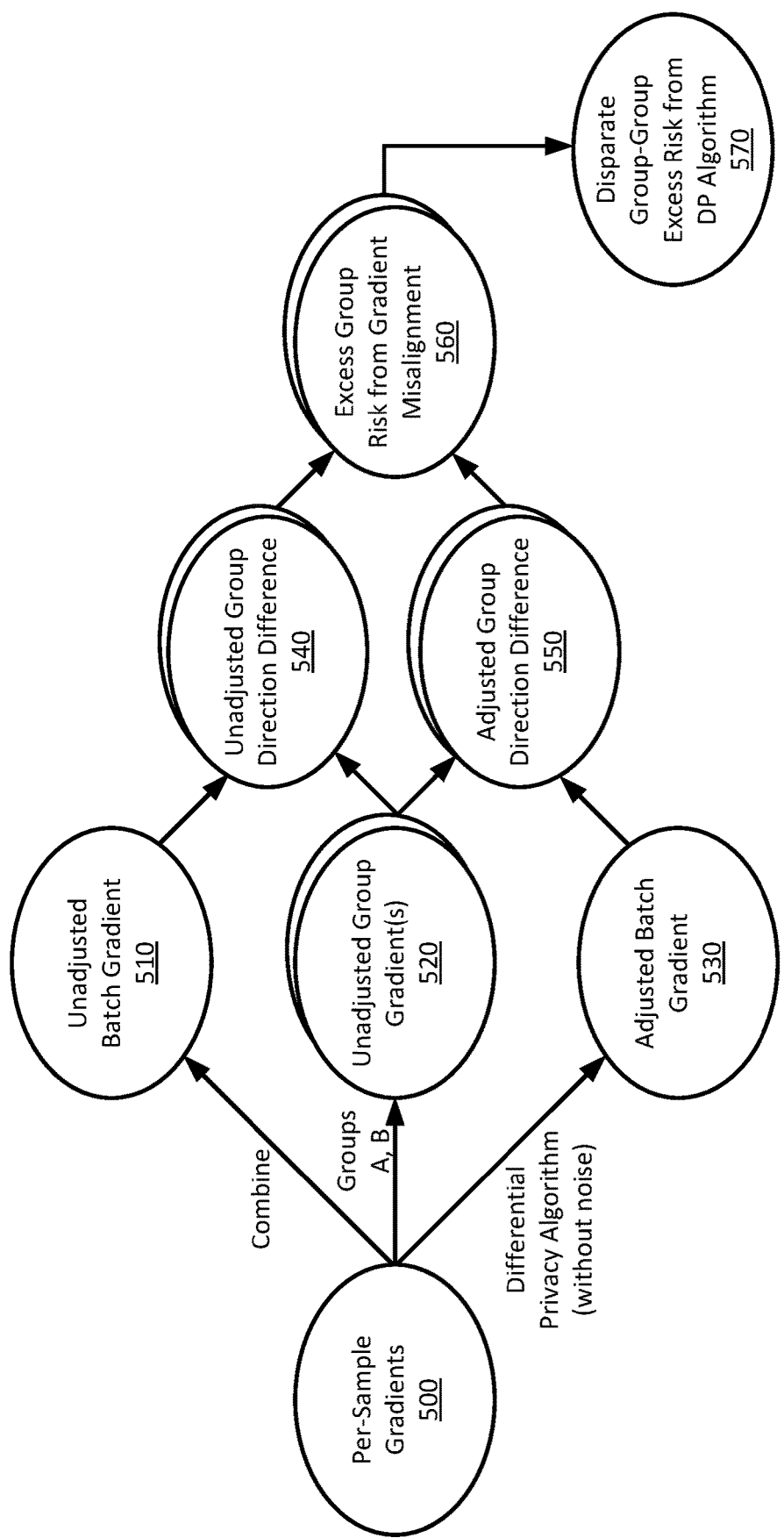
FIG. 5 illustrates a process for evaluating disparate group effects for a privacy-aware model training process, according to one embodiment.

FIG. 5 illustrates a process for evaluating disparate group effects for a privacy-aware model training process, according to one embodiment. For a particular batch of data samples (e.g., a particular training iteration), the per-sample gradients 500 may be determined based on the training loss and current model parameters as discussed above. Next, an unadjusted batch gradient 510 is determined by combining the per-sample gradients 500. The unadjusted batch gradient 510 may represent the batch gradients without the adjustments of the privacy-aware training process. Next, unadjusted group gradients 520 are determined for the relevant groups to be evaluated, for example, by combining the per-sample gradients for each respective group. The privacy-aware training process is applied to the per-sample gradients 500 to determine an adjusted batch gradient 530. Because the noise may be applied at the batch level and is also expected to cancel introduced biases, the adjusted batch gradient 530 may be determined without any noise.

Next, the angle between the group gradients and each of the batch gradients may be determined to determine a respective unadjusted group direction difference 540 and adjusted group direction difference 550. Each direction difference 540, 550 describes the angle between the unadjusted group gradient and the respective batch, and is evaluated in one embodiment as a cosine between the respective batch gradient and the group gradient. Excess group risk 560 in one embodiment may be evaluated by assessing an expectation across the group data samples as they affect the differences between the unadjusted group direction difference 540 and the adjusted group direction difference 550. In addition, disparate group-group excess risk 570 may be determined for the privacy-aware training (e.g., the effects of the per-sample gradient adjustment) based on the excess cost differences for the groups.

In one embodiment, this approximation may be determined from a difference the direction terms above ($R_a^{dir} - R_b^{dir}$) using $x^T y = \|x\|\|y\|\cos\theta$, where $\theta = \angle(x, y)$. In particular, when the loss $\ell$ is twice continuously differentiable and convex with respect to the model parameters and $\eta_t \leq (\max_{k \in [K]} \lambda_k)^{-1}$, where $\lambda_k$ is the maximum eigenvalue of the Hessian $H_\ell^k$ (which is true for many practical applications), a discrepancy between direction error of the groups ($R_a^{dir} > R_b^{dir}$), as one example of evaluating disparate group-group risk 570, may be approximated as:

$$\mathbb{E}\left[\|\bar{g}_B\|(\cos\theta_B^a - \cos\bar{\theta}_B^a)\right] > \qquad \text{Equation 2}$$
$$\frac{\|g_{D_b}\|}{\|g_{D_a}\|}\mathbb{E}\left[\|\bar{g}_B\|(\cos\theta_B^b - \cos\bar{\theta}_B^b)\right] + \frac{\mathbb{E}[\|\bar{g}_B\|^2]}{\|g_{D_a}\|}$$

Where: $\theta_B^k = \angle(g_{D_k}, g_B)$ and $\bar{\theta}_B^k = \angle(g_{D_k}, \bar{g}_B)$ for a group $k \in [K]$ In Equation 2, the evaluation of disparate impact between groups represented by the difference in excess risk from directional error ($R_a^{dir} > R_b^{dir}$) may be used to estimate the predicted excess risk gap ($R_{a,b}$) overall between the two groups because, as discussed above, the directional error is at least a primary (if not the only) source of this error when performing per-sample adjustments. As shown in FIG. 5 and Equation 2, if the clipping operation disproportionately (and sufficiently) increases the direction error for group a relative to group b, then group a incurs larger excessive risk due to gradient misalignment, revealing the disparate impact of the privacy-aware process on these groups.

These approaches may be used to estimate group excess risk (and disparate group-group risk) at the batch level for individual training iterations and do so more precisely than more generally evaluating adjustment-related privacy costs without particular evaluation of direction error.

In various embodiments, the calculated privacy costs for a group and/or disparate privacy costs across groups may be used for various purposes in addition to measuring such effects, e.g., by the fairness evaluation module 120, during model training of a non-private model 140 (e.g., by the model training module 110). While it may alone be valuable to accurately determine such privacy costs for these complex models as a diagnostic tool, they may also be applied to affect the training process. First, the privacy evaluation may be performed to assess the privacy cost and/or disparate privacy cost more effectively than other methods, such that the measured cost may be used to determine whether and how to expose model parameters, during or after training, to other entities. The excess group-group risk may also be evaluated during training to determine whether and to what extent one group over time is exposed to additional risk relative to other groups, such that the group-group differences may be monitored over time. When the effects of the group-group differences exceed a threshold, various actions may be taken, such as to end the model training or otherwise prevent further training with additional privacy costs to the disparately-affected group. In addition, multiple training approaches may be evaluated, and the group excess costs are determined for each, during iterations of the training approaches. The group excess costs and/or disparate group-group excess risk may then be used (optionally, along with other factors) to select one of the training approaches for further model training.

Improved DP-Training for Model Parameters

In addition to improved evaluation of group excess risk, the model training module 110 may also apply an improved privacy-aware training approach that provides a ($\epsilon$, $\delta$)-differentially private DP mechanism while measurably improving disparate group-group excess risk.

Figure 6:
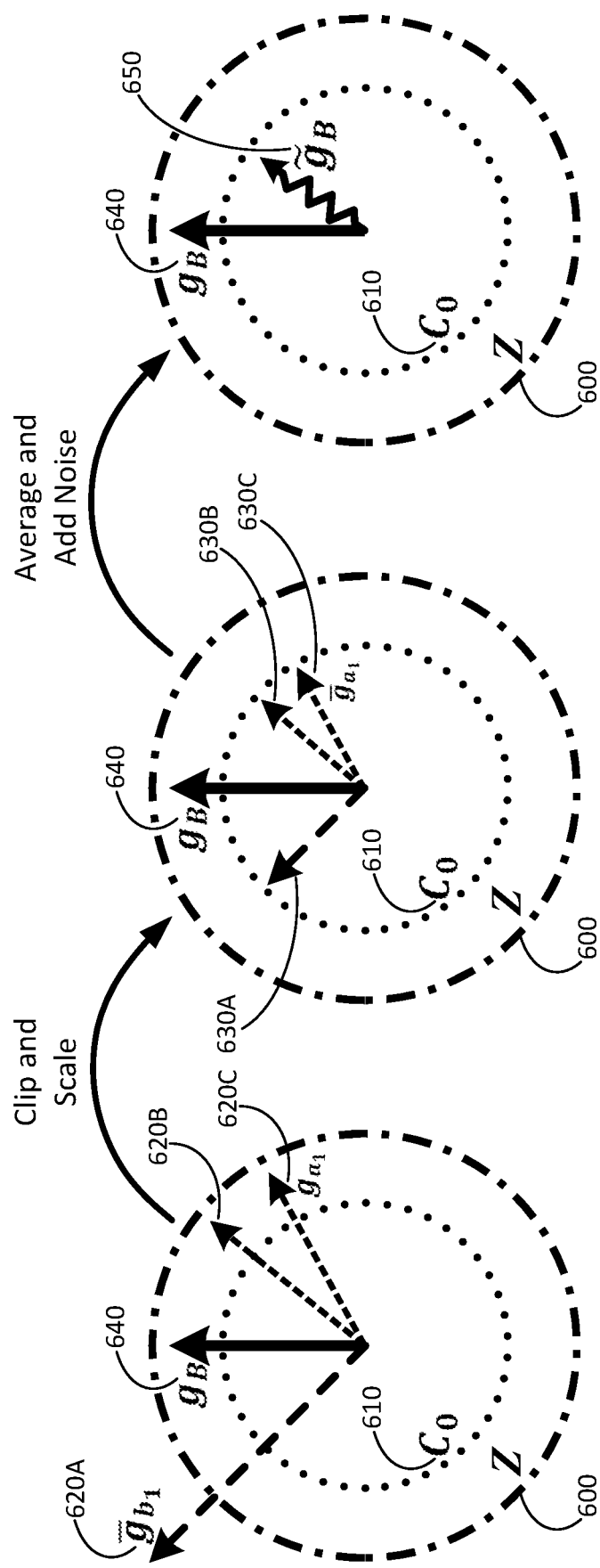
FIG. 6 illustrates an improved approach for per-sample scaling, according to one embodiment.

FIG. 6 illustrates an improved approach for per-sample scaling, according to one embodiment. Rather than clip the per-sample gradients at a clipping bound, or, alternatively, scaling all per-sample gradients, the per-sample gradients may be adjusted, in this embodiment, based on whether a norm (e.g., its magnitude) of the per-sample gradient exceeds a reference bound 600, labeled Z. An additional boundary, a clipping bound 610, labeled $C_0$, may represent a maximum magnitude for a per-sample gradient after application of the adjustment, providing a finite bound on the gradients after the adjustment. For gradients above the reference bound 600, the per-sample gradient may be reduced in magnitude to the clipping bound 610. For gradients below the reference bound 600, the per-sample gradient may be reduced by scaling the per-sample gradient according to a ratio of the clipping bound to the reference bound.

In the example of FIG. 6, a group of unadjusted per-sample gradients 620A-C may be determined as discussed above, such as with respect to FIG. 2, with a corresponding unadjusted batch gradient 640. A first unadjusted per-sample gradient 620A exceeds the reference bound 600 and is adjusted (i.e., clipped) to the magnitude of the clipping bound 610 to an adjusted per-sample gradient 630A. A second unadjusted per-sample gradient 620B and a third unadjusted per-sample gradient 620C are both below the reference bound 600 and are scaled with respect to the clipping bound 610 and the reference bound to respective adjusted per-sample gradients 630B-C. The adjusted per-sample gradients 630A-C may then be combined (along with noise) to generate an adjusted batch gradient 650. By combining clipping and scaling, this approach may bound the possible adjustments of a per-sample gradient without discarding any data samples or automatically applying a globally scaling that may cause smaller gradients to vanish. In addition, while evaluation of group-group disparity may require the group labels, this training process does not require group labels to improve group disparity, instead using a label-agnostic approach for gradient adjustment. In addition, and as discussed with FIG. 7, the reference bound may be adjusted with each training iteration, such that it may adaptively account for the frequency that per-sample gradients exceed the reference bound.

Figure 7:
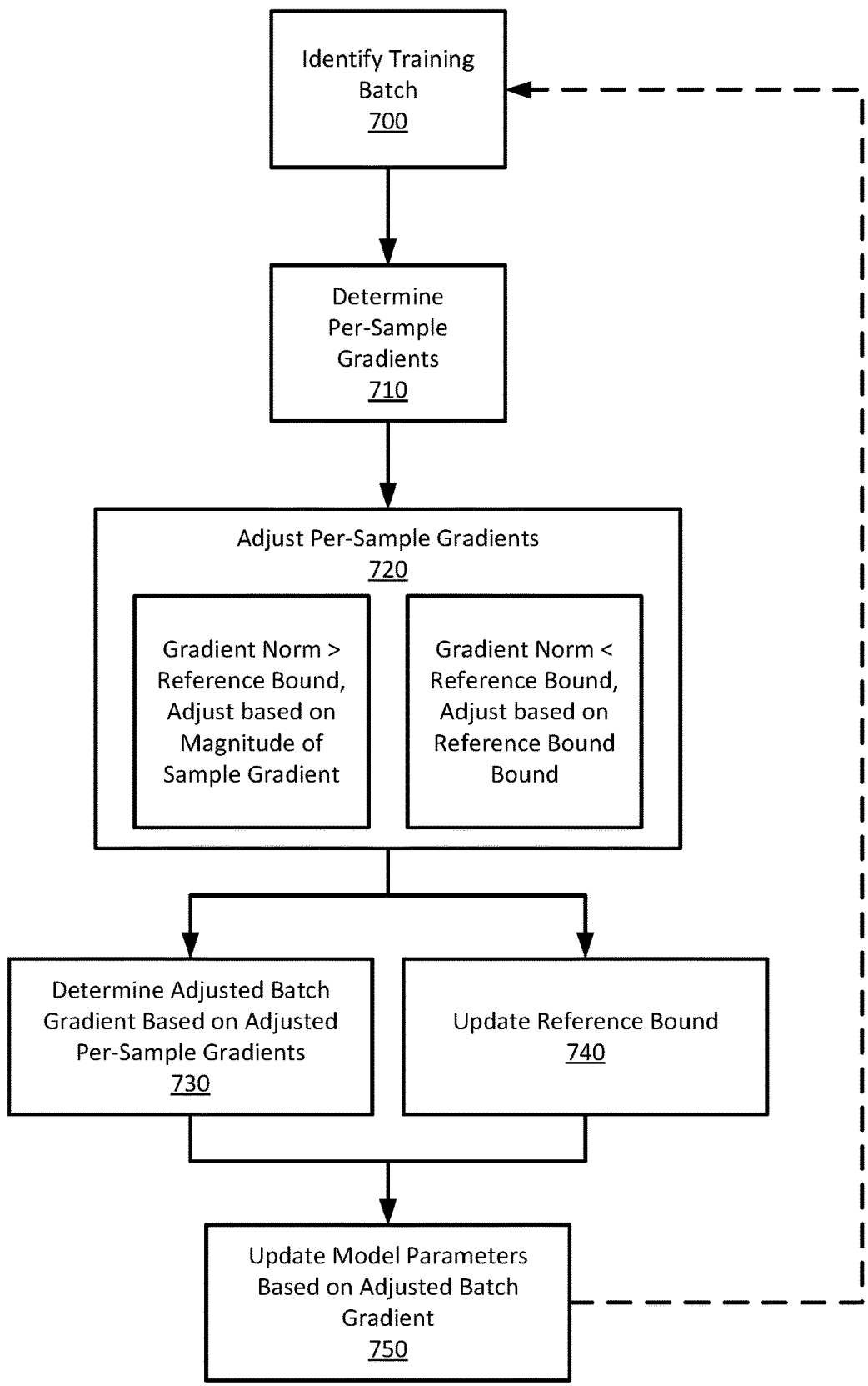
FIG. 7 is a flowchart for a process for privacy-aware model training, according to one embodiment.

FIG. 7 is a flowchart for a process for privacy-aware model training, according to one embodiment. The flowchart of FIG. 7 is one embodiment for applying the per-sample adjustments as shown in FIG. 6 for a training iteration of a computer model. First, a set of training data samples are identified 700 as a training batch, for example, by randomized selection from a set of training data. Next, the input vectors of the training data samples and the current model parameters applied determine a loss with respect to the training data levels and determine 710 respective per-sample gradients as discussed above.

Next, the per-sample gradients are adjusted 720 as discussed with respect to FIG. 6. In one embodiment, the per-sample gradients are adjusted based on whether they exceed the reference bound. The adjustment in one embodiment may also be based on a scaling factor determined based on whether the gradient norm exceeds the reference bound. The adjustment applied to a per-sample gradient may be a ratio of the clipping bound to the scaling factor (e.g., multiplying the per-sample gradient by the clipping bound and dividing by the scaling factor). For per-sample gradients higher than the reference bound, the per-sample gradients may be adjusted based on the magnitude of the per-sample gradient, for example by setting the scaling factor to the per-sample magnitude. For per-sample gradients having a norm lower than the reference bound, the per-sample gradient is adjusted based on the reference bound, for example by setting the scaling factor to the reference bound.

The adjusted per-sample gradients may then be combined to determine 730 the adjusted batch gradient. As also discussed above, the adjusted batch gradient may be determined by summing or averaging the per-sample gradients for the batch and include sampling from a random distribution (e.g., a Gaussian distribution) and adding noise with the sampled value.

In some embodiments, the reference bound may also be updated 740 in each training iteration. During the course of training, the magnitude of the training gradients may change as the training iterations continue and, preferably, the magnitude of the training gradients reduces over time as an optimal value (or at least a local optima) for the model parameters is determined. In addition, as the reference bound may clip relatively high per-sample gradients and is a reference for scaling per-sample gradients, a reference bound that is too high may result in excessive reduction in per-sample gradients, while a reference bound that is too low may result in a large number of per-sample gradients clipped to the clipping bound and reducing the informational value of the relative magnitudes of these gradients.

As such, the reference bound may be updated 740 in one embodiment based on a number or portion (e.g., percentage) of data samples having a norm that exceeds the reference bound (or a threshold value based on the reference bound). The number of data samples that exceed the reference bound may also be adjusted by an amount of noise (e.g., sampled from a Gaussian distribution) to add a privacy-aware component to the adjustment of the reference bound. In one embodiment, the number of data samples exceeding the reference bound, adjusted by noise, may be divided by the total number of data samples in the batch to determine a fractional portion of the data samples above the reference bound. In some embodiments, the reference bound may be biased to reduce in value, such that it generally increases when there is more than a threshold number of data samples (as may be adjusted by noise) and otherwise decreases. As one way of doing so, the fractional portion (or number of samples) may be reduced by a reference learning rate. The reference bound may then be updated based on the number of samples (e.g., after these adjustments). In some embodiments, the reference bound is updated based on the exponential function, for example, according to:

$$Z \leftarrow Z \cdot \exp(-\eta_Z + \tilde{b}_t)$$

In which Z is the reference bound, $\eta_Z$ is a reference learning rate, and $\tilde{b}_t$ is a fractional portion of per-sample gradients that exceed the reference bound after adjustment by adding noise. These processes provide a way for the reference bound to adaptively adjust as batch gradients may change over time, based on the adjusted per-sample gradients, and to do so while including differential-privacy guarantees.

Finally, the adjusted batch gradient is applied to update 750 the model parameters to complete the training iteration. The next training iterations may then proceed to identify 700 its training batch and determine 710 per-sample gradients based on the updated model parameters. Together, this process provides an improved approach for per-sample gradient adjustments that includes DP privacy guarantees, improved model accuracy, reduced group-group disparities, and without requiring group labels.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for evaluating differential privacy for groups in training data, comprising:
   one or more processors; and
   a non-transitory computer-readable medium having instructions executable by the one or more processors for:
   identifying a batch of training data samples, the batch of training data samples including at least one training data sample from a plurality of data groups;
   determining a set of per-sample gradients for training a computer model by applying the computer model with a set of current model parameter values to the batch of training data samples;
   determining an unadjusted batch gradient by combining the set of per-sample gradients;
   determining an adjusted batch gradient by applying a differential-privacy algorithm to the set of per-sample gradients, the differential-privacy algorithm modifying per-sample gradients;
   determining an excess risk for one or more data groups of the differential-privacy algorithm based on a direction error of data samples associated with the one or more groups, the direction error describing a change in direction between the adjusted batch gradient and the unadjusted batch gradient; and
   training the model based on the excess risk of the data group.

2. The system of claim 1, wherein the excess risk for a group is determined based on an orthogonal matrix describing a direction difference between the adjusted batch gradient and the unadjusted batch gradient.

3. The system of claim 2, wherein the direction error is determined based on:

$$\eta_t \langle g_{D_a}, \mathbb{E}\left[\frac{\|\bar{g}_B\|}{\|g_B\|}(g_B - M_B g_B)\right]\rangle + \frac{\eta_t^2}{2} \mathbb{E}\left[\frac{\|\bar{g}_B\|^2}{\|g_B\|^2}\left((M_B g_B)^T H_t^a (M_B g_B) - g_B^T H_t^a g_B\right)\right]$$

in which:
$\eta_t$ is a learning rate,
$g_{D_a}$ is an unadjusted group gradient,
$g_B$ is the unadjusted batch gradient,
$\bar{g}_B$ is the adjusted batch gradient,
$M_B$ is the orthogonal matrix,
$H_t^a$ is a Hessian of a loss function l evaluated over data samples of the group a, and
$\mathbb{E}$ is an expectation taken over the data samples of the group.

4. The system of claim 1, wherein the excess risk is a disparate group-group excess risk.

5. The system of claim 1, wherein the excess risk is determined for a first group relative to a second group is based on a difference between a first angle measured for an unadjusted group gradient and the unadjusted batch gradient and a second angle measured for the unadjusted group gradient and the adjusted batch gradient.

6. The system of claim 1, wherein the excess risk is determined for a first group relative to the second group according to:

$$\mathbb{E}\left[\|g_B\|(\cos\theta_B^a - \cos\bar{\theta}_B^a)\right] > \frac{\|g_{D_b}\|}{\|g_{D_a}\|}\mathbb{E}\left[\|g_B\|(\cos\theta_B^b - \cos\bar{\theta}_B^b)\right] + \frac{\mathbb{E}\left[\|\bar{g}_B\|^2\right]}{\|g_{D_a}\|}$$

Where: $\theta_B^k = \angle(g_{D_k}, g_B)$ and $\bar{\theta}_B^k = \angle(g_{D_k}, \bar{g}_B)$ $g_{D_a}$ is an unadjusted group gradient for the first group,
$g_{D_b}$ is an unadjusted group gradient for the second group,
$g_B$ is an unadjusted batch gradient,
$\bar{g}_B$ is an adjusted batch gradient, and
$\mathbb{E}$ is an expectation taken over the data samples of the respective groups and batch.

7. A method for evaluating differential privacy for groups in training data, the method comprising:
   identifying a batch of training data samples, the batch of training data samples including at least one training data sample from a plurality of data groups;

determining a set of per-sample gradients for training a computer model by applying the computer model with a set of current model parameter values to the batch of training data samples;

determining an unadjusted batch gradient by combining the set of per-sample gradients;

determining an adjusted batch gradient by applying a differential-privacy algorithm to the set of per-sample gradients, the differential-privacy algorithm modifying per-sample gradients;

determining an excess risk for one or more data groups of the differential-privacy algorithm based on a direction error of data samples associated with the one or more groups, the direction error describing a change in direction between the adjusted batch gradient and the unadjusted batch gradient; and training the model based on the excess risk of the data group.

8. The method of claim 7, wherein the excess risk for a group is determined based on an orthogonal matrix describing a direction difference between the adjusted batch gradient and the unadjusted batch gradient.

9. The method of claim 8, wherein the direction error is determined based on:

$$\eta_t \langle g_{D_a}, \mathbb{E}\left[\frac{\|\bar{g}_B\|}{\|g_B\|}(g_B - M_B g_B)\right]\rangle + \frac{\eta_t^2}{2}\mathbb{E}\left[\frac{\|\bar{g}_B\|^2}{\|g_B\|^2}((M_B g_B)^T H_\ell^a (M_B g_B) - g_B^T H_\ell^a g_B)\right]$$

in which:

$\eta_t$ is a learning rate, $g_{D_a}$ is an unadjusted group gradient, $g_B$ is the unadjusted batch gradient, $\bar{g}_B$ is the adjusted batch gradient, $M_B$ is the orthogonal matrix, $H_\ell^a$ is a Hessian of a loss function l evaluated over data samples of the group a, and $\mathbb{E}$ is an expectation taken over the data samples of the group.

10. The method of claim 7, wherein the excess risk is a disparate group-group excess risk.

11. The method of claim 7, wherein the excess risk is determined for a first group relative to a second group is based on a difference between a first angle measured for an unadjusted group gradient and the unadjusted batch gradient and a second angle measured for the unadjusted group gradient and the adjusted batch gradient.

12. The method of claim 7, wherein the excess risk is determined for a first group relative to the second group according to:

$$\mathbb{E}\left[\|\bar{g}_B\|(\cos\theta_B^a - \cos\bar{\theta}_B^a)\right] > \frac{\|g_{D_b}\|}{\|g_{D_a}\|}\mathbb{E}\left[\|\bar{g}_B\|(\cos\theta_B^b - \cos\bar{\theta}_B^b)\right] + \frac{\mathbb{E}[\|\bar{g}_B\|^2]}{\|g_{D_a}\|}$$

Where: $\theta_B^k = \angle(g_{D_k}, g_B)$ and $\bar{\theta}_B^k = \angle(g_{D_k}, \bar{g}_B)$ $g_{D_a}$ is an unadjusted group gradient for the first group, $g_{D_b}$ is an unadjusted group gradient the second group, $g_B$ is an unadjusted batch gradient, $\bar{g}_B$ is an adjusted batch gradient, and $\mathbb{E}$ is an expectation taken over the data samples of the respective groups and batch.

13. A non-transitory computer-readable medium for training a computer model with differential privacy and reduced group-group privacy disparity, the non-transitory computer-readable medium comprising instructions that, when executed by a processor, cause the processor to:

identify a batch of training data samples, the batch of training data samples including at least one training data sample from a plurality of data groups;

determine a set of per-sample gradients for training a computer model by applying the computer model with a set of current model parameter values to the batch of training data samples;

determine an unadjusted batch gradient by combining the set of per-sample gradients;

determine an adjusted batch gradient by applying a differential-privacy algorithm to the set of per-sample gradients, the differential-privacy algorithm modifying per-sample gradients;

determine an excess risk for one or more data groups of the differential-privacy algorithm based on a direction error of data samples associated with the one or more groups, the direction error describing a change in direction between the adjusted batch gradient and the unadjusted batch gradient; and train the model based on the excess risk of the data group.

14. The non-transitory computer-readable medium of claim 13, wherein the excess risk for a group is determined based on an orthogonal matrix describing a direction difference between the adjusted batch gradient and the unadjusted batch gradient.

15. The non-transitory computer-readable medium of claim 13, wherein the direction error is determined based on:

$$\eta_t \langle g_{D_a}, \mathbb{E}\left[\frac{\|\bar{g}_B\|}{\|g_B\|}(g_B - M_B g_B)\right]\rangle + \frac{\eta_t^2}{2}\mathbb{E}\left[\frac{\|\bar{g}_B\|^2}{\|g_B\|^2}((M_B g_B)^T H_\ell^a (M_B g_B) - g_B^T H_\ell^a g_B)\right]$$

in which:

$\eta_t$ is a learning rate, $g_{D_a}$ is an unadjusted group gradient, $g_B$ is the unadjusted batch gradient, $\bar{g}_B$ is the adjusted batch gradient, $M_B$ is the orthogonal matrix, $H_\ell^a$ is a Hessian of a loss function l evaluated over data samples of the group a, and $\mathbb{E}$ is an expectation taken over the data samples of the group.

16. The non-transitory computer-readable medium of claim 13, wherein the excess risk is a disparate group-group excess risk.

17. The non-transitory computer-readable medium of claim 13, wherein the excess risk is determined for a first group relative to a second group is based on a difference between a first angle measured for an unadjusted group gradient and the unadjusted batch gradient and a second angle measured for the unadjusted group gradient and the adjusted batch gradient.

18. The non-transitory computer-readable medium of claim 13, wherein the excess risk is determined for a first group relative to the second group according to:

$$\mathbb{E}\left[\|\bar{g}_B\|(\cos\theta_B^a - \cos\bar{\theta}_B^a)\right] > \frac{\|g_{D_b}\|}{\|g_{D_a}\|}\mathbb{E}\left[\|\bar{g}_B\|(\cos\theta_B^b - \cos\bar{\theta}_B^b)\right] + \frac{\mathbb{E}[\|\bar{g}_B\|^2]}{\|g_{D_a}\|}$$

-continued

Where: $\theta_B^k = L(g_{D_k}, g_B)$ and $\bar{\theta}_B^k = L(g_{D_k}, \bar{g}_B)$ $g_{D_a}$ is an unadjusted group gradient for the first group,
$g_{D_b}$ is an unadjusted group gradient for the second group,
$g_B$ is an unadjusted batch gradient,
$\bar{g}_B$ is an adjusted batch gradient, and
$\mathbb{E}$ is an expectation taken over the data samples of the respective groups and batch.

\* \* \* \* \*